(No Model.)
W. J. BURNETT.
HOT AIR AND STEAM HEATER.
No. 429,882. Patented June 10, 1890.
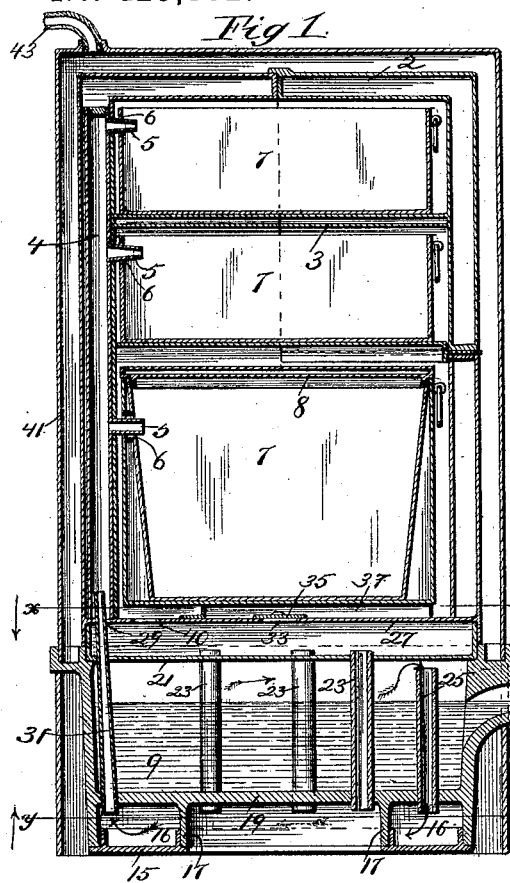
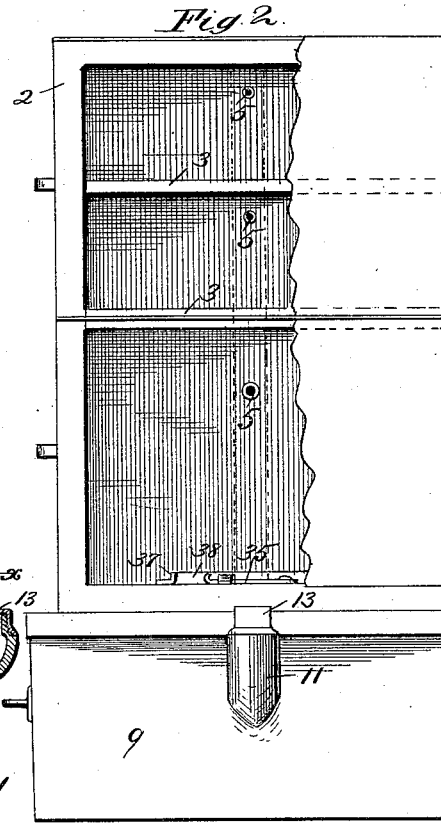
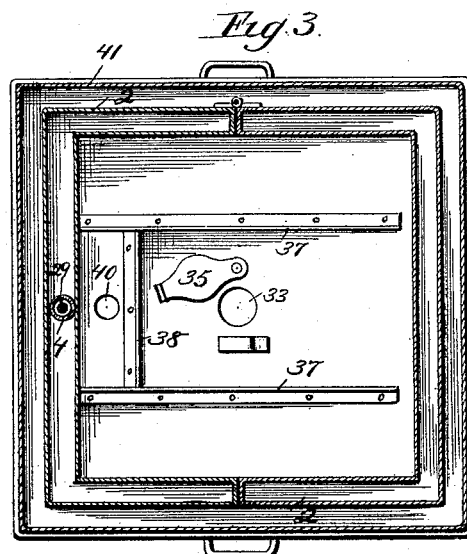
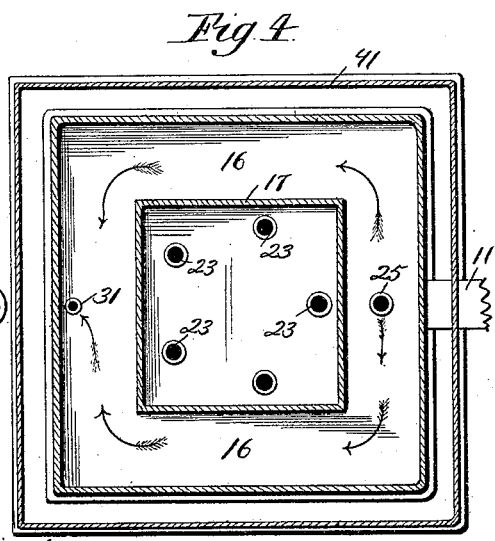
Witnesses:
J. Jensen
Roy S. Gaskill
Inventor
William J. Burnett
By Paul Merwin attys

UNITED STATES PATENT OFFICE.

WILLIAM J. BURNETT, OF HURON, (DAKOTA TERRITORY,) SOUTH DAKOTA.

HOT-AIR AND STEAM HEATER.

SPECIFICATION forming part of Letters Patent No. 429,882, dated June 10, 1890.

Application filed September 2, 1889. Serial No. 322,666. (No model.)

*To all whom it may concern:*

Be it known that I, WILLIAM J. BURNETT, of Huron, in the county of Beadle and Territory of Dakota, have invented certain new Improvements in Combined Hot-Air and Steam Heaters, of which the following is a specification.

The object of this invention is to provide an improved heating-vessel designed, primarily, for cooking purposes in which the material to be heated or cooked will be subjected to a current of hot air and superheated steam.

The invention consists, generally, in the construction and combination, hereinafter described, and particularly pointed out in the claims.

In the accompanying drawings, forming a part of this specification, Figure 1 is a vertical section of my improved device. Fig. 2 is a side elevation of the same, with the outside cover and the cooking-receptacle removed and a portion of the wall broken away to show the interior arrangement. Fig. 3 is a transverse section on line $x$ $x$ of Fig. 1, looking downward. Fig. 4 is a transverse section on line $y$ $y$ of Fig. 1, looking upward. Fig. 5 is a detail.

In the drawings, 2 represents the main part or section of the device, which is preferably in the form of a casing, divided into any desired number of compartments by suitable transverse partitions 3. The casing 2 is preferably divided vertically into two sections, one section being hinged to the other, and the movable section is preferably divided into two or more parts transversely, each part being provided with hinges and being capable of being opened or swung back separately.

The casing 2 is formed with double walls, having a space between them which forms a dead-air space and retains the heat in cooking-compartments. A pipe 4 extends upward in the space between the walls of the casing, and a series of pipes or tubes 5 project from the pipe 4 through the inner wall of the casing into the cooking-compartments. A series of cooking vessels or trays 7 are arranged within the casing 2. These vessels are in the form of drawers, and by opening the hinged sections of the casing any one or more of these drawers may be drawn out of the casing. Each of the drawers 7 is provided with an opening 6 in its wall, which is adapted to fit over the pipe 5. By this means the hot-air and steam from the pipe 4 may pass directly into the cooking-vessels 7.

The casing 2 is arranged upon or secured to a suitable vessel 9, which is adapted to contain water and to have the same heated therein by placing the vessel upon a suitable stove or over a suitable flame or other heating means. The vessel 9 is preferably provided with an inlet-spout 11, having a screw-cap 13, through which the vessel may be filled with water. The bottom of the vessel 9 is in the form of a plate 15, having an open center, and an upright wall 17 extends around the inner edge of the plate 15, forming an inner wall for the bottom part of the vessel. A second bottom 19 extends across the vessel 9, above the wall 17, thereby forming a separate superheating-chamber 16 of the space inclosed between the lower portion of the outer wall of the vessel, the plate 15, the wall 17, and the outer portion of the bottom 19. At the center of the vessel the bottom 19 is not covered, but is exposed to the flame of other heating medium. A plate 21 is arranged across the vessel 9, and a series of pipes 23 extend through the bottom 19 and into the space above the plate 21. These tubes form a passage for the hot air to pass through the vessel 9 and into the said space, as hereinafter described. A pipe 25, having its upper end arranged near the top of the vessel 9, extends through the bottom 19 and into the space above the plate 15. A plate 27 forms the bottom of the casing 2, and is arranged at a short distance above the plate 21, thus providing an air-space between these two plates. This space communicates by an opening 29 with the lower end of the pipe 4 between the two walls of the casing 2, hereinbefore described. A pipe 31 extends from the space between the bottom 19 and the plate 15 or superheating-chamber 16 through the vessel 9 and through the opening 29 into the lower end of the pipe 4. This pipe is of smaller diameter than the opening 29 and the pipe 4, and forms an inflector which drains the heated air through the opening 29 into the pipe 4. An opening 33 is formed in the plate 27, thus providing communication from the air-space between the plates 21 and 27 to the lower cooking-chamber. A cover 35 is provided for closing this opening when desired. Ribs 37 are arranged on the bottom of the lower cooking-chamber and the lower cooking-vessel rests upon these ribs, thus permitting an air-space beneath this vessel.

A rib 38 extends at right angles to the ribs 37, and when the vessel is resting on these ribs the heated air must pass through the space at the front of the vessel. It then passes over the vessel. An opening 40 is made in the bottom of this compartment in the rear of the rib 38 and the rear of the injector-pipe 31, and sufficient suction is created by the injector to draw air through the opening 40, thus creating a current through the lower compartment.

A suitable cover 41 may be provided for inclosing the entire apparatus when desired, and this cover may be provided with a pipe 43, through which any steam or vapor escaping into the interior of the cover 41 may be led to any desired point.

The operation of the device is as follows: A quantity of water is placed in the vessel 9, and the material to be cooked or heated is placed in the receptacles 7, which are put into the casing 2 and the hinged sections of which are closed. The device is then placed upon a stove or over a suitable flame, and the heated air passes through the pipes 23 into the air-space above it. The water in the vessel 9 becomes heated, and the steam which is generated passes through the pipe 25 into the chamber 16, where it is superheated. From this chamber it passes through the pipe 31 into the pipe 4. A suction is created thereby, which draws the heated air through the opening 29 into this pipe, and the steam and heated air now pass through the pipes 5 into the receptacles 7. Thereby the material within these receptacles is properly heated or cooked. When it is desired, the cover 35 may be opened, and the heated air will pass directly into the lower cooking-chamber.

The lower compartment is for cooking with steam or without. By opening the hold under the first vessel containing food and closing the pipe 5 leading into this compartment by a plug or other device it will cook dry. By reversing this operation it becomes a steamer.

While I have shown a device of rectangular form, it may be circular or of other suitable shape.

In some instances I prefer to form the vessel which is used in the lower compartment with a double wall, as shown in Fig. 1, and also to provide it with a cover 8, having a double wall. When it is desired to cook slowly by heated air, the pipe 5 communicating with this vessel may be stopped up and the heated air circulated around the outside of the double vessel and cause the material to be slowly cooked. When it is desired to steam the material in the lower vessel, the steam-pipe 5 is opened. Both the outer jacket 41 and the main vessel may be provided with suitable handles for lifting the device.

I claim as my invention—

1. In a device of the class described, the combination, with the vessel 9, having a superheating-chamber extending around the bottom thereof, of a pipe from said vessel communicating with said chamber, an air-chamber above said vessel, a series of pipes extending through said vessel and communicating with said chamber, a casing arranged above said chamber and provided with a series of cooking-compartments, a pipe having its lower end connected with said air-chamber and provided with branch pipes communicating with said cooking-compartments, and a steam-injector pipe extending from said superheating-chamber into said last-named pipe, substantially as described.

2. The combination, with the casing provided with a series of cooking-compartments and with a series of hinged sections permitting access to said compartments, of a series of drawers or cooking-receptacles arranged to be inserted in said compartments, and a pipe provided with branches or nipples extending into said compartments and adapted to receive at its lower end both steam and hot air, substantially as described.

3. The combination, with the vessel 9, provided with a superheating-chamber, with an air-chamber arranged above said vessel, of a casing provided with cooking-compartments, a double-wall vessel arranged within one of said compartments, a pipe communicating with said heated-air chamber and provided with a branch or nipple extending into said cooking-vessel, and an injector-pipe extending from said superheating-chamber into the lower end of said last-named pipe, substantially as described.

In testimony whereof I have hereunto set my hand this 29th day of August, 1889.

WILLIAM J. BURNETT.

In presence of—
A. C. PAUL,
BESSIE BOOTH.